June 3, 1969  D. L. WHITEHEAD  3,448,202
ENCLOSED ELECTRIC POWER TRANSMISSION CONDUCTORS
Original Filed July 26, 1965   Sheet 1 of 2

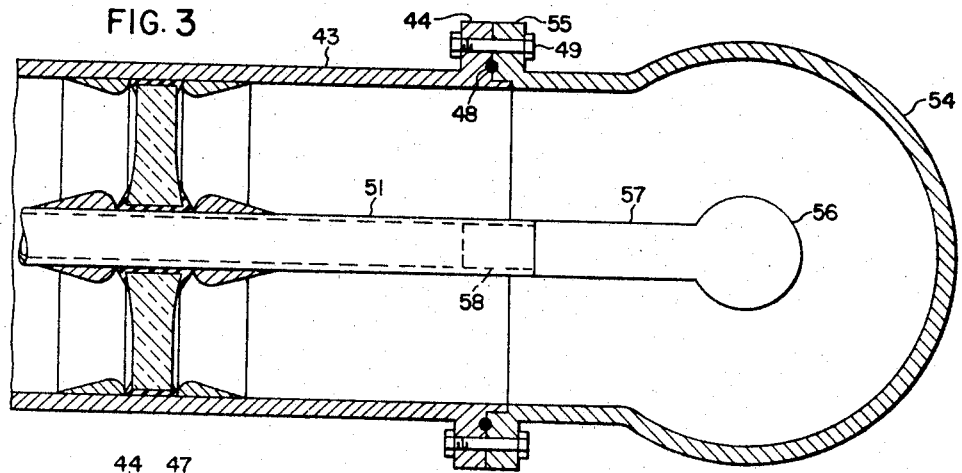
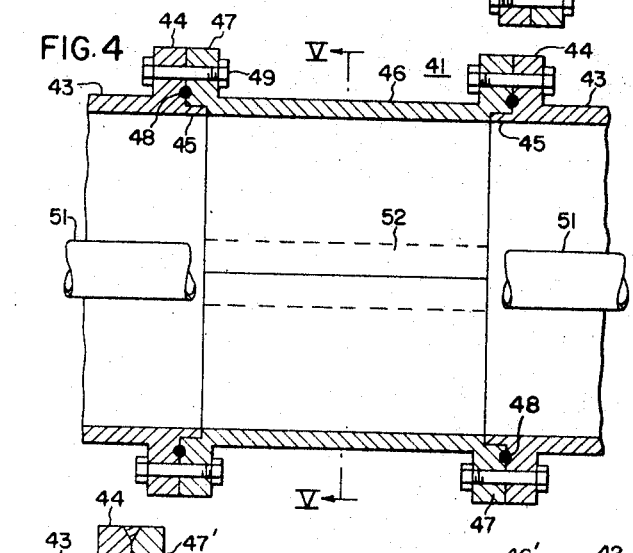
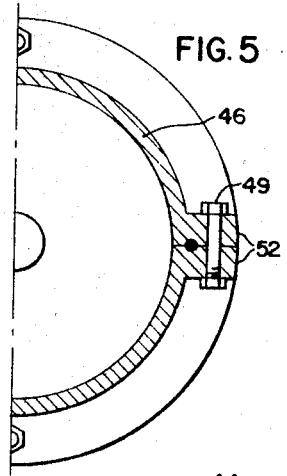
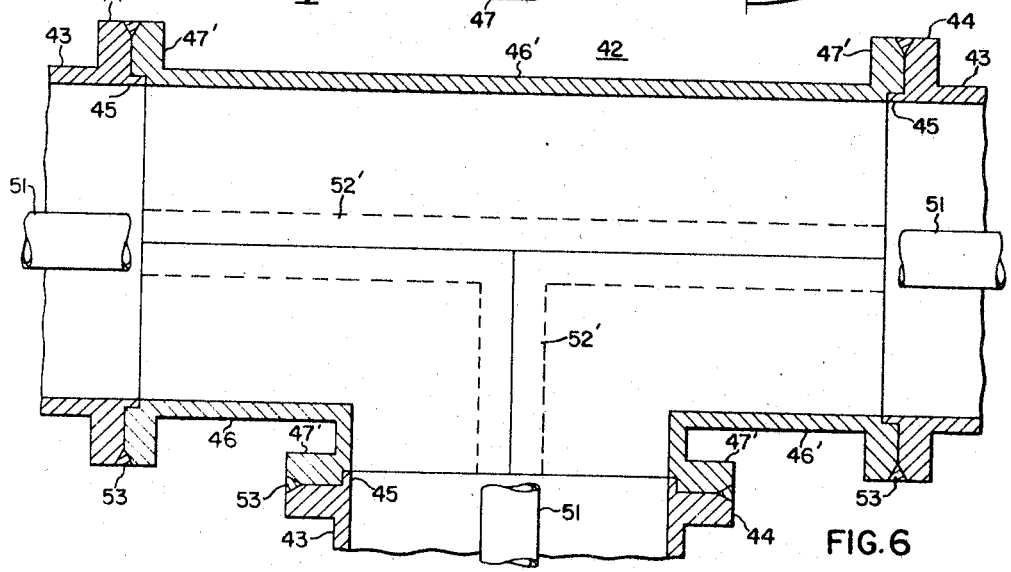

United States Patent Office 3,448,202
Patented June 3, 1969

3,448,202
ENCLOSED ELECTRIC POWER TRANSMISSION CONDUCTORS
Daniel L. Whitehead, Export, Pa., assignor to Westinghouse Electric Corporation, Pittsburgh, Pa., a corporation of Pennsylvania
Original application July 26, 1965, Ser. No. 474,779, now Patent No. 3,378,731, dated Apr. 16, 1968. Divided and this application Dec. 11, 1967, Ser. No. 689,473
Int. Cl. *9/04, 9/06, 11/18*
U.S. Cl. 174—28                                7 Claims

ABSTRACT OF THE DISCLOSURE

A joint construction for pressurized coaxial sections of pipe enclosing high-voltage conductors, in a power transmission system, to enable ready access thereto, uses overlapping end flanges and longitudinal split halves. A three-part T-shaped jointing section may be used for lateral feed lines.

A bonnet may be provided to terminate a pressurized conductor, under maintenance conditions, with an internal spherical member or ball attached to the high-voltage conductor. The insulators supporting the high-voltage conductor within the outer grounded pipe may have plastic at their center portions to avoid gaps or separations at the conductor; or slightly conducting rubber grommets may be used at the central high-voltage conductor, as well as at the outer pipe-supporting portion. Shielding members at the high voltage conductor, as well as at the outer pipe, may be used to reduce the intense electrical gradient.

---

This application is a divisional application of U.S. patent application, filed July 26, 1965, S.N. 474,779, now U.S. Patent 3,378,731, issued Apr. 16, 1968, to Daniel L. Whitehead entitled "High Voltage Substation for Metropolitan Areas" and assigned to the assignee of the present application.

This invention relates, generally, to electric power distribution systems and, more particularly, to enclosed power transmission conductors.

The power demands of some of our large metropolitan cities have reached such proportions that is is now necessary to transmit power into such cities at 345,000 volts with the possibility of eventually goiong to much higher voltages. Present practice is to use a cable system under the city streets with risers to outdoor substations and switchyards. The switchyards comprise disconnect switches, circuit breakers, lightning arresters, transformers and auxiliary apparatus so connected as to provide electrical service to local areas. With prior substation construction techniques, the area required for a typical 345 kv. substation is indeed large. Engineers at an electric utility company in one of our large cities have estimated that a 345 kv. substation to serve a certain portion of the city would require 17 acres of land. Such large areas simply are not available in that district.

As set forth in United States Patent 3,378,731, such areas can be drastically reduced by a high-voltage substation involving energized parts and conductors enclosed by grounded conducting sheaths or pipes, thereby precluding the possibility of personnel coming into contact with high-voltage conductors. To provide such enclosed electrical power transmission conductors, constructional problems of jointing, termination under maintenance conditions, sealing, lateral feed lines, etc. must be surmounted. The present invention is concerned with such problems as insulatingly supporting high-voltage conductors within grounded pipes, providing joints therefor, preventing corona, providing termination, providing pressure seals along the joints when the grounded enclosing pipes are pressurized with a gas, such as sulfur-hexafluoride ($SF_6$) gas under pressure, shielding of the high-voltage enclosed power transmission conductor, etc.

Accordingly, a general object of the present invention is to provide an improved enclosed electric-power transmission conductor with a novel joint construction therefor.

A still further object of the invention is to prevent corona at the joints between the insulators and the conductors and between the insulators and the pipes which enclose the conductors and the insulators for supporting the conductors inside the pipes.

Another object of the invention is to provide a sealed joint for connecting together sections of the enclosing pipe.

A further object of the invention is to provide for repressurizing a gas-insulated sectionalized substation structure up to a point where a section of the structure is removed for maintenance.

Other objects of the invention will be explained fully hereinafter or will be apparent to those skilled in the art.

In accordance with the present invention, an enclosed high-voltage power transmission conductor is provided with jointing sections to permit access to the conductor. For effecting termination of the pressurized high-voltage conductor, during maintenance operations, a bonnet may be used together with an internal ball supported at the termination of the high-voltage conductor.

To prevent the occurrence of corona, disk insulators having internal and external grommets, or plastic, to prevent separation may be employed. Additionally, shielding members may be provided around the central high-voltage conductor as well as at the outer pipe portion to reduce the electrical gradient.

For a better understanding of the nature and objects of the invention, reference may be had to the following detailed description, taken in conjunction with the accompanying drawings, in which:

FIG. 3 is a view, in section, of a bonnet for capping the end of a conductor and pipe when a section of the structure is taken out of service;

FIG. 4 is a view, in section, of a bolted joint for connecting two sections of the enclosing pipe together;

FIG. 5 is a sectional view taken along the lines V—V in FIG. 4; and

FIG. 6 is a view, in section, of a welded T-joint for connecting sections of the enclosing pipe together.

Figure 1:
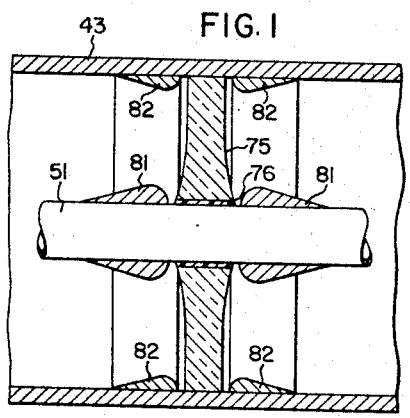
FIG. 1 is a view, in section, of an insulator for supporting the conductor in the pipe.

The transformer and the disconnect switches of the substation of U.S. Patent 3,378,731 are interconnected by conductors, each one of which is enclosed in a grounded conducting housing containing a high dielectric strength gas, such as $SF_6$. Other gases such as carbon dioxide, nitrogen and even air or various mixtures of these gases may be utilized if desired. However, $SF_6$ is particularly suitable in view of its high dielectric strength. The gas is maintained in the enclosing pipes with respect to the size of the conductor inside the pipe will depend upon the operating voltage, the dielectric strength of the insulating medium and the pressure at which the medium is maintained. By operating at a pressure of approximately 15 pounds p.s.i.g., no special pressure vessel codes need be considered. In some cases the additional cost of meeting pressure vessel codes required for the higher pressures would dictate the use of the lower pressures with the corresponding increase in size of the conductor housings. In other cases where space is at a premium, the additional cost of meeting pressure codes would be justified.

The pipes which enclose the conductors are preferably composed of a good conducting metal, such as aluminum. However, the pipes may be made from one of the modern plastics, particularly for lower pressure operations. In case plastic pipes are utilized, the outside of each pipe should be coated with a good conducting or semiconducting material to ensure that it would be at ground potential as a safety measure.

In order to facilitate the sectionalizing of the substation structure of the foregoing Patent 3,378,731 sections of the pipes which enclose the conductors can be bolted or welded together by utilizing joints or junctions 41 and 42. As shown in FIG. 4, the joint 41 is suitable for connecting two coaxial sections of pipe 43 together. As shown in FIG. 6, the T-shaped joint 42 is suitable for connecting three sections of pipe, one of which is disposed at a right angle to the two coaxial sections. Each section of pipe 43 has a flange 44 at its end with a rim 45 extending beyond the flange 44. A coupling member 46 has a flange 47 at each end. A portion of each flange 47 overlaps the rim 45 on the end of one of the pipe sections 43. An O-ring seal 48 is provided to prevent gas leakage when the flanges are bolted together by means of bolts 49. In order to provide access to the joint between sections of a conductor 51 inside of the pipe 43, the coupling member 46 is divided longitudinally and provided with lateral flanges 52 which are bolted together by bolts 49 as shown in FIG. 5.

In the T-shaped joint 42 shown in FIG. 6, the coupling member 46' is divided into three pieces, thereby providing for connecting three sections of pipe 43, one of which is disposed at a right angle to the other two sections. The flanges on the pipe 43 and the coupling members may be joined by welds 53. The rims 45 prevent any weld bead or waste material from entering the system. To open the welded joint it is necessary to grind off the exterior weld. However, the flanges are sufficiently wide to permit this to be done a number of times if required.

The conductors 51 may be joined by welding or by compression fittings of the type described in a copending application Serial No. 474,799, filed July 26, 1965, now U.S. Patent 3,391,243, issued July 2, 1968, D. L. Whitehead. As previously stated, the coupling members 41, 42 are divided to permit them to be removed to provide access to the joints between the conductors 51.

If it is necessary to remove a section of bus or other apparatus, a bonnet 54 may be attached to the end of the pipe 43 as shown in FIG. 3. In this manner the pipe is capped or closed to permit re-pressurizing of the system up to that point. As shown, the bonnet 54 is generally spherical in shape to minimize voltage gradients and has a flange 55 which may be attached to the flange 44 on the end of the pipe 43 by means of bolts 49.

In order to prevent corona at the end of the conductors 51 a generally spherical member 56 may be attached to the end of the conductor. The member 56 has a stem 57 with a reduced portion 58, which may be inserted into the end of the hollow conductor 51, thereby retaining the member 56 in proper position inside the spherical bonnet 54.

One critical problem that arises in a pressurized system of the present type is the proper construction of the insulators which support the conductors inside the pressurized pipes. With the high voltage gradients involved, particular attention must be paid to the joints between each insulator and conductor and the insulator and the pressure pipe, or between an insulator and a ground return conductor if one is used. Normally, the joint between the insulator and the central conductor is the critical one since the stresses are higher there. If epoxy, or other resin material, is used for the insulator, a good joint can be made by molding the insulator to the conductor and using generous fillets at the point of connection. If porcelain or glass is used for the insulators, the problem becomes more critical. Tests have shown that even very small separations between the insulator and the conductor result in low values of breakdown voltage. This problem can be solved by filling the void between the insulator 75 and the conductor 51 with plastic material 76, such as epoxy, as shown in FIG. 1.

Figure 2:
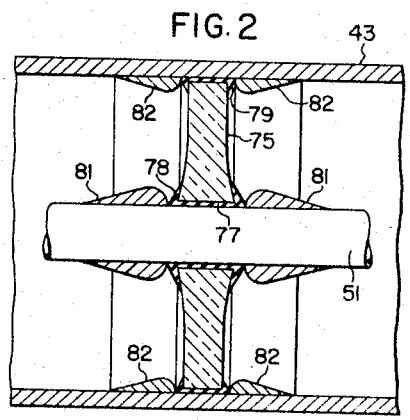
FIG. 2 is a view, in section, of another insulator.

Another and better solution is shown in FIG. 2, where the space is filled with a rubber compound grommet 77. Carbon-filled neoprene, which is a conducting resilient material, is suitable for this application. The grommet is beveled at 78 to minimize the voltage gradient in the critical areas. With a normal dielectric constant of approximately one-half of that of the insulator disc, a favorable dielectric grading results. The elasticity of the rubber compound also distributes and relieves mechanical stress between the insulator and the conductor, particularly those occurring during assembly and during short-circuit fault conditions. A similar ring grommet 79 is disposed between the outer rim of the insulator 75 and the inner periphery of the pipe 43.

The high gradients at the edge of the insulator junction with the conductor may also be reduced by providing shielding members 81 around the conductor 51 adjacent the grommet 78. The shielding member 81 have the effect of placing the insulator 75 down in a slot or recess, thereby reducing the high gradients in a manner described in a copending application Serial No. 474,774, filed July 26, 1965, now U.S. Patent 3,324,272, issued June 6, 1967, to D. F. Shankle and L. A. Kilgore and assigned to the Westinghouse Electric Corporation. Similar shielding rings 82 may be provided around the inner periphery of the pipe 43 adjacent the grommet 79. Likewise, shielding rings 81 and 82 may be provided adjacent the insulator shown in FIG. 1.

The same problems involving return paths and their associated losses are present in the compact substation as in the transmission system described in aforesaid Patent 3,391,243. One solution consists of simply making the pressure pipe from good conducting, nonmagnetic material, such as aluminum, with sufficient cross section to keep the losses to an acceptable value. If steel pipes are used, a return liner or its equivalent, as described in the aforesaid patent, can be used.

I claim as my invention:

1. In an electric power distribution system, in combination, a cylindrical conducting pipe, a conductor disposed inside the pipe, a generally-disc-shaped insulator surrounding the conductor to support it in the pipe, plastic material disposed between the insulator and the conductor, shielding members surrounding the conductor adjacent the insulator, and additional shielding members disposed around the inner periphery of the pipe adjacent the insulator.

2. In an electric power distribution system, in combination, a cylindrical conducting pipe, a conductor disposed inside the pipe, a generally disc-shaped insulator surrounding the conductor to support it in the pipe, a grommet composed of conducting elastomer resilient material disposed between the insulator and the conductor, and a similar grommet disposed between the outer rim of the insulator and the pipe.

3. In an electric power distribution system, in combination, a cylindrical conducting pipe, a conductor disposed inside the pipe, a generally disc-shaped insulator surrounding the conductor to support it in the pipe, a grommet composed of conducting resilient material disposed between the insulator and the conductor, a similar grommet disposed between the outer rim of the insulator and the pipe, shielding members surrounding the conductor adjacent the grommet on the conductor, and additional shielding members disposed around the inner periphery of the pipe adjacent the grommet on the outer rim of the insulator.

4. In an electric power distribution system, in combination, a cylindrical conducting pipe, a conductor disposed inside the pipe, a generally disc-shaped insulator surrounding the conductor to support it in the pipe, a grommet composed of conducting elastomeric resilient material disposed between the insulation and the conductor, and a similar grommet disposed between the outer rim of the insulator and the pipe, each one of said elastomeric grommets having beveled portions overlapping portions of the insulator to minimize the gradients in the critical areas between the insulator and the conductor and between the insulator and the pipe.

5. In an electric power distribution system, in combination, a cylindrical hollow conductor, a generally cylindrical pipe enclosing the conductor, a flange at the end of the pipe, a generally spherical bonnet having a flange thereon for attaching to the flange on the pipe to cap the end of the pipe, and a generally spherical member having a stem for inserting into the end of the hollow conductor to terminate the conductor inside the bonnet.

6. In an electric power distribution system, in combination, a conductor, a sectionalized generally cylindrical pipe enclosing the conductor, each pipe section having a flanged end with a rim extending beyond the flange, a coupling having flanged ends overlapping the rims and attached to the flanged pipe ends, and said coupling being divided longitudinally with flanges on the divided portions for joining them together.

7. In an electric power distribution system, in combination, a conductor, a sectionalized generally cylindrical pipe enclosing the conductor, each pipe section having a flanged end with a rim extending beyond the flange, a T-shaped coupling having flanged ends overlapping the rims and attached to the flanged pipe ends, and said T being divided longitudinally and transversely into three portions with flanges on the divided portions for joining them together.

References Cited

UNITED STATES PATENTS

| | | | |
|---|---|---|---|
| 1,885,195 | 11/1932 | Green | 174—28 |
| 2,216,010 | 9/1940 | Hobart | 174—28 |
| 2,221,671 | 11/1940 | Cooper | 174—28 X |
| 2,701,864 | 2/1955 | Cork et al. | 174—28 X |
| 2,741,321 | 4/1956 | McCoy et al. | 174—140 |
| 3,325,583 | 6/1967 | Frowein | 174—73 X |
| 3,356,785 | 11/1967 | Yasuhisa Yoshida et al. | 174—28 |

FOREIGN PATENTS

| | | |
|---|---|---|
| 498,116 | 1/1939 | Great Britain. |
| 693,860 | 6/1950 | France. |
| 397,081 | 8/1933 | Great Britain. |
| 856,241 | 6/1940 | France. |

LEWIS H. MYERS, *Primary Examiner.*

A. T. GRIMLEY, *Primary Examiner.*

U.S. Cl. X.R.

174—19, 111, 142